(12) United States Patent
Desai et al.

(10) Patent No.: US 7,436,289 B2
(45) Date of Patent: Oct. 14, 2008

(54) REMOTE KEYLESS ENTRY SYSTEM WITH TWO MODES OF DEMODULATION

(75) Inventors: Tejas B. Desai, Sterling Heights, MI (US); Michael Thomas, Grand Blanc, MI (US)

(73) Assignee: Continental Automotive Systems US, Inc., Auburn Hills ( * ) Notice: Subject to any disclaimer, the term of this patent is extended or adjusted under 35 U.S.C. 154(b) by 76 days.

(21) Appl. No.: 11/440,859

(22) Filed: May 26, 2006

(65) Prior Publication Data

US 2006/0220907 A1 Oct. 5, 2006

Related U.S. Application Data

(62) Division of application No. 09/935,199, filed on Aug. 22, 2001, now Pat. No. 7,102,498.

(60) Provisional application No. 60/227,416, filed on Aug. 23, 2000.

(51) Int. Cl.
*B60R 25/10* (2006.01)
*B60C 23/00* (2006.01)
*G05B 19/00* (2006.01)
*H04B 1/38* (2006.01)
*H03K 9/00* (2006.01)
*H03D 5/00* (2006.01)

(52) U.S. Cl. .............. 340/426.13; 340/539.1; 340/447; 340/5.61; 340/5.72; 375/222; 375/316; 455/143

(58) Field of Classification Search ........... 340/447, 340/539.1, 426.13, 5.61, 5.72; 455/143; 375/316, 222
See application file for complete search history.

(56) References Cited

U.S. PATENT DOCUMENTS 4,065,722 A 12/1977 Francis (Continued)

FOREIGN PATENT DOCUMENTS

DE 197 20 123 A1 7/1998

(Continued)

OTHER PUBLICATIONS

European Search Report Application No. EP 01 20 3160 completed Mar. 17, 2003.

*Primary Examiner*—Benjamin C Lee

(57) ABSTRACT

A remote signaling receiver system includes a receiver that operates in two different modes of demodulation to accommodate different types of signals from different types of transmitting devices. A first demodulator, preferably an ASK demodulator, is adapted to process signals from a signal transmitter that generates a first type of signal. A second demodulator, preferably one that is not sensitive to amplitude modulation such as a FSK demodulator, is adapted to process signals received from at least one other type of device, which provides a second type of signal. A system designed according to this invention is particularly useful as a remote keyless entry system for a vehicle where one or more sensors are provided on the vehicle to provide an indication of a chosen condition of one or more of the vehicle components.

5 Claims, 1 Drawing Sheet

U.S. PATENT DOCUMENTS

| | | | |
|---|---|---|---|
| 4,737,967 A * | 4/1988 | Cahalan | 375/223 |
| 4,887,280 A * | 12/1989 | Reisenfeld | 375/377 |
| 5,287,112 A | 2/1994 | Schuermann | |
| 5,430,770 A | 7/1995 | Abbey | |
| 5,451,958 A | 9/1995 | Schuermann | |
| 5,552,789 A | 9/1996 | Schuermann | |
| 5,602,524 A | 2/1997 | Mock et al. | |
| 5,771,226 A * | 6/1998 | Kaku | 370/232 |
| 5,874,903 A | 2/1999 | Shuey et al. | |
| 5,909,826 A | 6/1999 | Credle, Jr. | |
| 6,198,779 B1 | 3/2001 | Taubenheim et al. | |
| 6,420,967 B1 | 7/2002 | Ghabra et al. | |
| 6,598,098 B1 * | 7/2003 | Agami et al. | 710/29 |
| 6,650,236 B2 | 11/2003 | Ghabra et al. | |
| 6,904,101 B1 | 6/2005 | Tang | |
| 7,102,498 B2 * | 9/2006 | Desai et al. | 340/447 |
| 2002/0149477 A1 | 10/2002 | Desai et al. | |

FOREIGN PATENT DOCUMENTS

| | | |
|---|---|---|
| WO | WO 92/21195 | 11/1992 |

* cited by examiner

REMOTE KEYLESS ENTRY SYSTEM WITH TWO MODES OF DEMODULATION

CROSS REFERENCE TO RELATED APPLICATIONS

This application is a continuation of U.S. Ser. No. 09/935,199, which was filed on Aug. 22, 2001, and claims priority to U.S. Provisional Application No. 60/227,416 filed Aug. 23, 2000.

BACKGROUND OF THE INVENTION

This invention generally relates to signal communication in remote signaling systems. More particularly, this invention relates to handling two types of signals using a receiver that operates, in part, as part of a remote keyless entry system.

Remote keyless entry systems for vehicles are well known. In typical arrangements a receiver is mounted on the vehicle that receives wireless communication signals from a portable, hand held transmitter used by an owner of the vehicle. Typical transmitters are embodied in a key fob having switches that are activated by the vehicle owner to indicate a desired action on the part of the remote keyless entry system, such as unlocking the doors or the trunk. The receivers typically used in such systems are amplitude shift keying (ASK) receivers. Such receivers are effective for receiving the radio frequency signals typically generated by transmitters in remote keyless entry systems.

ASK receivers are limited, however, to handling only certain types of signals. More recently, it has become desirable to incorporate multiple functions into fewer or the same number of components. These multiple functions now require receivers in such systems to handle more than one type of remotely generated signal. For example, it has been proposed to incorporate sensors on different components of a vehicle that will generate wireless communication signals indicating a sensed condition of the particular component. Because of the nature of such sensors and surrounding vehicle components, for example, the ASK receivers are not capable of adequately handling such signals so that useful information could be processed.

ASK receivers typically are programmed to enter a sleep mode except when an expected signal is present. This is accomplished through conventional squelch techniques. Therefore, typical strategies do not permit conventional receiver configurations to recognize various types of signals.

This invention provides a unique approach to enabling a receiver for a remote keyless entry system to also handle signals generated by one or more sensors placed on the vehicle to indicate a condition of a chosen component.

SUMMARY OF THE INVENTION

In general terms, this invention is a remote signaling receiver system having the ability to process more than one type of received signal.

The invention is particularly useful in a remote keyless entry system for a vehicle that includes a portable transmitter that generates a wireless communication signal. At least one sensor device generates a wireless communication signal indicating a condition sensed by the sensor. A single receiver includes a first demodulator for processing signals from the portable transmitter. The receiver also has a second demodulator for processing signals from the sensor.

In one example, the receiver is mounted on the vehicle and the sensor is mounted on a vehicle component. The portable transmitter is a hand held transmitter used by a vehicle owner to gain access to the vehicle, for example. The demodulator in the receiver that processes signals from the portable transmitter is an ASK demodulator. The demodulator within the receiver that processes signals from the sensor mounted on the vehicle is a demodulator that processes signals is not affected by unwanted amplitude modification such as a frequency shift keying (FSK) demodulator or a phase shift keying (PSK) demodulator, for example.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
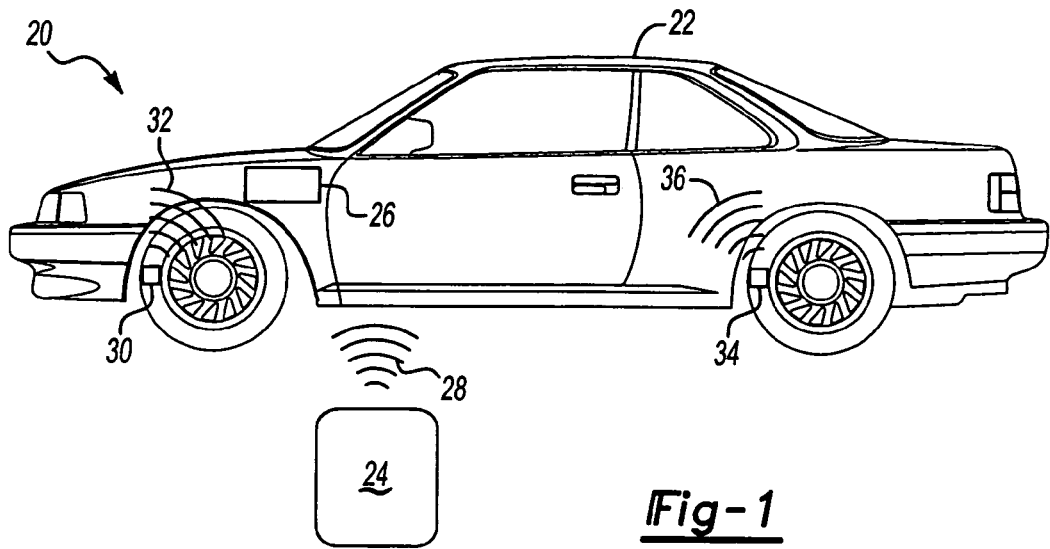
FIG. 1 schematically illustrates a system designed according to this invention.

A remote keyless entry system 20 allows a vehicle owner to control certain functions on a vehicle 22 by utilizing a portable transmitter 24. A receiver 26 mounted on the vehicle receives wireless communication signals (schematically illustrated at 28) from the portable transmitter 24, which indicates the vehicle owner's intentions. Examples include a signal to unlock the doors or to open the trunk. Such transmitters are known in the art and have more functions than those just mentioned. The radio frequency signals generated by such transmitters are also known.

The vehicle 22 preferably includes at least one sensor 30 that provides a wireless communication signal (schematically illustrated at 32) that provides an indication of a condition sensed by the sensor. The illustrated example includes another sensor 34 that generates a remote communication signal (schematically illustrated at 36). The illustrated embodiment includes tire pressure sensors that provide an indication of tire pressure. Other sensors useful with other vehicle components are within the scope of this invention.

The receiver 26 in the illustrated example preferably processes signals from the remote, portable transmitter 24 and from each of the sensors 30, 34 supported on the vehicle. A receiver designed according to this invention may receive signals from other types of signaling devices or signal sources.

The receiver 26 preferably includes the ability to demodulate signals from different sources using different modes of demodulation.

Figure 2:
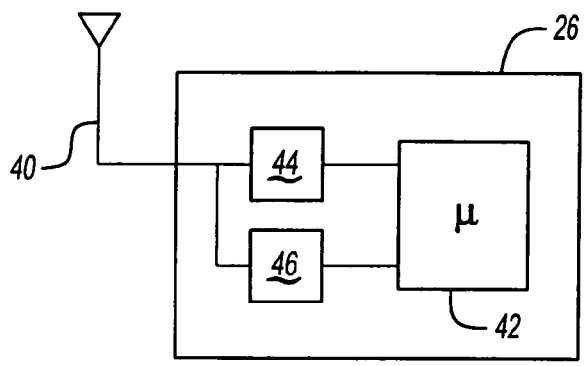
FIG. 2 schematically illustrates a receiver designed according to this invention.

As schematically illustrated in FIG. 2, the receiver 26 includes an antenna 40 for receiving signals from a plurality of remotely located devices. "Remotely located" as used in this description refers to a location remote from the receiver 26. Such devices may be remote from a vehicle or supported on the vehicle, for example.

A microprocessor 42 associated with the receiver 26 preferably is programmed to recognize and process the various signals received by the receiver and to then communicate with whatever devices are necessary to achieve the results desired based upon the communication received. For example, when a signal is received from the transmitter 24 indicating a vehicle owner's intention to unlock the doors, the microprocessor 42 preferably is programmed to interpret such a signal and then to cause the door lock controller to unlock the doors. Another example would be to receive a signal from one of the sensors on the vehicle and to have that information stored in an appropriate memory location or to provide a warning signal to a driver regarding a condition of the associated vehicle component.

The receiver 26 preferably includes a first demodulator 44 that is adapted to process the signals received from the portable transmitter 24. In this example, because the portable transmitter 24 generates wireless communication signals as known in remote keyless entry systems, the demodulator 44 is an ASK demodulator.

A second demodulator 46 preferably is capable of handling signals unaffected by unwanted amplitude modulation. In one example, the second demodulator 46 is a FSK demodulator that is adapted to process signals from the one or more sensors 30, 34 associated with the chosen vehicle components. Therefore, the receiver 26 is capable of receiving and processing two different types of communication signals from different types of devices.

There are a variety of strategies for utilizing the two demodulators of the receiver that are within the scope of this invention. One example strategy is to have the ASK demodulator 44 receive all signals that are gathered by the antenna 40. Whenever the signal is appropriately demodulated by the demodulator 44, the output is then processed by the microprocessor 42 in a manner that provides the intended results. In the event that the received signal cannot be demodulated by the ASK demodulator 44 (i.e., the output cannot be interpreted by the microprocessor 42), the signal is then demodulated using the FSK demodulator 46. In the event that the signal is a valid signal from an appropriate device, the results are then processed by the microprocessor 42 as needed for a particular situation.

Figure 3:
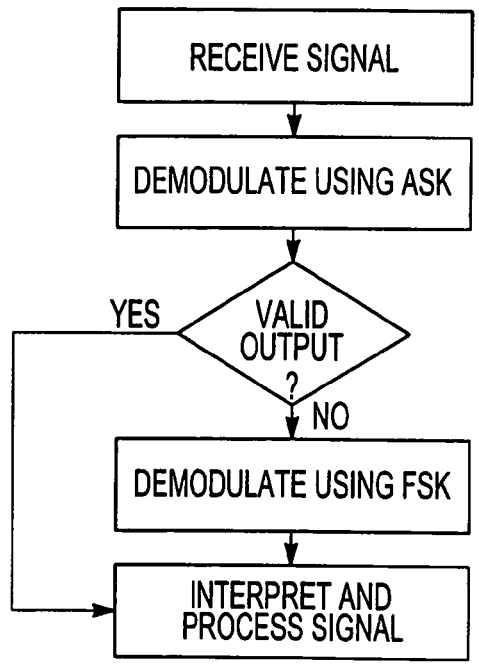
FIG. 3 is a flow chart diagram illustrating an example control strategy associated with a system designed according to this invention.

This example operation strategy is illustrated in FIG. 3 in flow chart 50. This particular strategy takes advantage of the fact that an ASK receiver will not provide a valid output when receiving FSK-based signals. Whenever the output from the demodulator 44 is not interpretable by the microprocessor 42, the demodulator 46 then is used to demodulate the signal.

In one example, signals from the portable transmitter 24 include a 2K baud rate while the signals generated by the sensors 30, 34 include a 9.6 K baud rate. The different baud rates provide an ability for the microprocessor portion 42 to decipher between the different types of signals as demodulated using the demodulators 44 or 46.

Whenever a wanted signal is received by the receiver 26, it preferably is sliced or translated to TTL levels. The preferred slice level is between one-half and two-thirds of the peak-to-peak voltage of the received signal. The data slicer preferably is arranged to slice the data using the average of the baseband output of the receiver as a reference level. The reference level preferably is shifted to squelch the output if the peak voltage of the baseband output is higher than the level for the signal plus appropriate tolerances.

When ASK data is present, the output represents the signal sliced to TTL levels. When FSK data is present, the output is squelched high or low during the presence of an FSK signal or a sufficiently large period of time to represent a code violation. The receiver would be placed in the ASK demodulation mode and the microprocessor would decode the incoming signal if ASK data is present and would shift to the FSK demodulator if a code violation as stated above is encountered.

In another example, the receiver normally operates in an FSK mode. When using an FSK demodulator, the maximum amplitude of the desired signal is typically less than the peak-to-peak amplitude of the noise since the output voltage is directly proportional to the frequency deviation from the nominal center frequency of the received signal. This provides a manner of controlling the processing of signals received by the receiver 26, which allows for two different modes of demodulation to be used for handling two different types of signals.

While the receiver is operating in FSK mode and an FSK signal is received it will be appropriately decoded by the microcontroller. If an ASK signal is received when the receiver is in FSK mode, the output would be squelched during one state and there would be noise during the other state, which can be used as an indication to switch back to an ASK mode. By recognizing the pattern of highs and lows in the received signal, the microcontroller is able to determine when to shift from the default FSK mode to the ASK mode.

Another example includes having the two demodulators operating simultaneously. The microcontroller in this example deciphers which mode of demodulation is needed for a received signal and then processes it accordingly. In this example, the received signals are effectively handled using two different channels. The remote keyless entry signal may be received on the normal radio frequency channel while the vehicle component sensor signal is received on the image channel. The microprocessor in this example preferably is programmed to observe the phase of the incoming signal and to cause the appropriate demodulator to be used. In this example, the signal frequencies provide information for distinguishing between the different signals.

While the examples discussed above focus on using an ASK demodulator and a FSK demodulator, other types of demodulators are useful within the scope of this invention. For example, phase shift keying (PSK) demodulators may be used as the second demodulator 46 when an ASK demodulator is used as the first demodulator 44.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A remote signaling receiver system comprising:
a microcontroller having a radio frequency channel and a second, different channel, the microcontroller determining a baud rate of a received wireless communication signal, the microcontroller causing a received wireless communication signal from a manually controllable transmitter device having a first baud rate to be received for processing on the radio frequency channel and causing a wireless communication signal of a second, different baud rate from a sensor device that automatically generates the signal having the second baud rate to be received for processing on the second channel.

2. The system of claim 1, wherein the first baud rate is lower than the second, different baud rate.

3. The system of claim 1, wherein the first baud rate corresponds to a signal from a remote keyless entry transmitter device and wherein the second baud rate corresponds to a signal from a sensor device that generates a wireless communication signal indicating a sensed condition of a vehicle component.

4. The system of claim 1, wherein the processing on the radio frequency channel is used for ASK demodulation and the processing on the image channel is used for at least one of FSK or PSK demodulation.

5. The system of claim 1, wherein the second channel is an image channel.

* * * * *